(12) United States Patent
Tang et al.

(10) Patent No.: US 10,085,129 B2
(45) Date of Patent: *Sep. 25, 2018

(54) MOBILE DEVICE COMMUNICATION

(71) Applicant: Microsoft Technology Licensing, LLC, Redmond, WA (US)

(72) Inventors: Difei Tang, Beijing (CN); Sin Lew, Bellevue, WA (US); Wei Hun Liew, Beijing (CN); Kong-Kat Wong, Renton, WA (US); Sun H. Shaw, Beijing (CN); Xu Ji, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,396

(22) Filed: Apr. 10, 2017

(65) Prior Publication Data

US 2017/0215055 A1 Jul. 27, 2017

Related U.S. Application Data

(63) Continuation of application No. 14/469,469, filed on Aug. 26, 2014, now Pat. No. 9,654,207, which is a (Continued)

(51) Int. Cl.
*H04W 4/20* (2018.01)
*H04W 4/80* (2018.01)
(Continued)

(52) U.S. Cl.
CPC ............ *H04W 4/20* (2013.01); *H04W 4/008* (2013.01); *H04W 4/023* (2013.01); *H04W 4/80* (2018.02);
(Continued)

(58) Field of Classification Search
CPC ..... H04W 88/06; H04W 76/02; H04W 40/24; H04W 84/12; H04W 48/16; H04W 48/17;
(Continued)

(56) References Cited

U.S. PATENT DOCUMENTS 6,243,581 B1 6/2001 Jawanda
6,526,034 B1 2/2003 Gorsuch
(Continued)

FOREIGN PATENT DOCUMENTS

CN 1836403 A 9/2006
CN 1981502 A 6/2007
(Continued)

OTHER PUBLICATIONS

"Extended Search Report Issued in European Patent Application No. 17172662.3", dated Oct. 2, 2017, 7 Pages.
(Continued)

*Primary Examiner* — Olumide T Ajibade Akonai
(74) *Attorney, Agent, or Firm* — Rainier Patents, P.S.

(57) ABSTRACT

Described is a technology by which a mobile computing device such as a mobile telephone operates differently based on detected proximity to another mobile device with which the first mobile device has a defined relationship. For example, the first mobile device may transfer content to the second mobile computing device when proximity corresponds to a non-cellular communications coupling, such as Bluetooth® or Wi-Fi coupling. In this manner, content transfer is deferred until a non-cellular coupling exists. The mobile device (or both devices) may output a notification to indicate that the other mobile computing device has been detected within a threshold proximity, such as via GPS data or by being within the same cellular tower. The type and/or settings of an output notification may vary based on different thresholds.

17 Claims, 6 Drawing Sheets

Related U.S. Application Data continuation of application No. 11/947,789, filed on Nov. 30, 2007, now Pat. No. 8,838,152.

(51) Int. Cl.
| | |
|---|---|
| *H04W 4/02* | (2018.01) |
| *H04W 88/06* | (2009.01) |
| *H04W 4/00* | (2018.01) |
| *H04W 84/12* | (2009.01) |
| *H04W 84/04* | (2009.01) |

(52) U.S. Cl.
CPC .......... *H04M 2203/2094* (2013.01); *H04M 2250/64* (2013.01); *H04W 84/042* (2013.01); *H04W 84/12* (2013.01); *H04W 88/06* (2013.01)

(58) Field of Classification Search
CPC ..... H04W 48/18; H04W 60/04; H04W 36/14; H04W 92/20
See application file for complete search history.

(56) References Cited

U.S. PATENT DOCUMENTS

| | | | |
|---|---|---|---|
| 6,539,232 | B2 | 3/2003 | Hendrey et al. |
| 6,553,236 | B1 | 4/2003 | Dunko et al. |
| 6,658,264 | B1 | 12/2003 | Irvin |
| 6,823,190 | B2 | 11/2004 | Ford et al. |
| 6,968,179 | B1 | 11/2005 | De Vries |
| 6,985,747 | B2 | 1/2006 | Chithambaram |
| 7,116,985 | B2 | 10/2006 | Wilson et al. |
| 7,167,680 | B2 | 1/2007 | Haller et al. |
| 7,171,221 | B1 | 1/2007 | Amin et al. |
| 7,187,923 | B2 | 3/2007 | Mousseau et al. |
| 7,289,814 | B2 | 10/2007 | Amir et al. |
| 7,324,818 | B2 | 1/2008 | Gallagher et al. |
| 7,925,212 | B2 | 4/2011 | Eisenbach |
| 8,428,645 | B2 | 4/2013 | Rao |
| 8,838,152 | B2 | 9/2014 | Tang et al. |
| 8,880,047 | B2 | 11/2014 | Konicek et al. |
| 9,654,207 | B2 * | 5/2017 | Tang .................. H04M 1/7253 |
| 2003/0013456 | A1 | 1/2003 | Bates et al. |
| 2004/0047323 | A1 | 3/2004 | Park et al. |
| 2004/0179545 | A1 | 9/2004 | Erola et al. |
| 2004/0198398 | A1 | 10/2004 | Amir et al. |
| 2004/0203381 | A1 | 10/2004 | Cahn et al. |
| 2005/0059400 | A1 | 3/2005 | Jagadeesan et al. |
| 2005/0255878 | A1 | 11/2005 | Leinonen et al. |
| 2006/0009155 | A1 | 1/2006 | Paalasmaa et al. |
| 2006/0148532 | A1 | 7/2006 | Schnurr |
| 2006/0189348 | A1 | 8/2006 | Montulli et al. |
| 2006/0199580 | A1 | 9/2006 | Zhang |
| 2007/0117576 | A1 | 5/2007 | Huston |
| 2007/0121536 | A1 | 5/2007 | Aihara |
| 2007/0161382 | A1 | 7/2007 | Melinger et al. |
| 2008/0254811 | A1 | 10/2008 | Stewart |
| 2009/0111490 | A1 | 4/2009 | Bell et al. |
| 2009/0131045 | A1 | 5/2009 | Feuer et al. |
| 2009/0143056 | A1 | 6/2009 | Tang et al. |
| 2014/0364166 | A1 | 12/2014 | Tang et al. |

FOREIGN PATENT DOCUMENTS

| | | |
|---|---|---|
| EP | 1220501 A3 | 12/2003 |
| JP | 11041663 | 2/1999 |
| JP | 2001275147 | 10/2001 |
| JP | 2001352377 | 12/2001 |
| KR | 1020040056859 A | 7/2004 |
| WO | 0145319 A1 | 6/2001 |
| WO | 03101025 A2 | 12/2003 |
| WO | 2004075169 | 9/2004 |
| WO | 2004082212 A2 | 9/2004 |
| WO | 2005076542 A1 | 8/2005 |
| WO | 2005103860 A1 | 11/2005 |
| WO | 2005107791 A1 | 11/2005 |
| WO | 2007102110 A2 | 9/2007 |

OTHER PUBLICATIONS

Examination Report dated Oct. 15, 2015 from European Patent Application No. 08857008.0, 7 pages.
Response filed Feb. 4, 2016 to the Official Communication dated Oct. 15, 2015 from European Patent Application No. 08857008.0, 11 pages.
Main Request and Auxiliary Requests I to III filed Jun. 14, 2016 in response to the Summons dated Apr. 11, 2016 from European Patent Application No. 08857008.0, 39 pages.
Summons to Attend Oral Proceedings pursuant to Rule 115(1) EPC dated Apr. 11, 2016 from European Patent Application No. 08857008. 0, 5 pages.
Response filed Dec. 2, 2016 to the Telephone Conversation on Nov. 16, 2016 from European Patent Application No. 08857008.0, 12 pages.
Brief Communication dated Dec. 8, 2016 from European Patent Application No. 08857008.0, 2 pages.
Communication under Rule 71(3) EPC dated Jan. 9, 2017 from European Patent Application No. 08857008.0, 53 pages.
First Office Action dated Aug. 3, 2012 from Chinese Patent Application No. 200880118685.2, 9 pages.
Examiner-Initiated Interview Summary dated Mar. 9, 2011 from U.S. Appl. No. 11/974,789, 3 pages.
Examiner-Initiated Interview Summary dated Aug. 22 , 2011 from U.S. Appl. No. 11/974,789, 3 pages.
Supplemental Response filed May 1, 2014 to the Notice of Allowance dated Feb. 3, 2014 from U.S. Appl. No. 11/974,789, 9 pages.
Response and Amendment filed May 15, 2013 to the First Office Action dated Feb. 15, 2013 from Japanese Patent Application No. 2010-536034, 10 pages.
Preliminary Report on Patentability dated Jun. 10, 2010 from PCT Patent Application No. PCT/US2008/081242, 6 pages.
Non-Final Office Action dated Oct. 9, 2014 from U.S. Appl. No. 14/469,469, 14 pages.
Response filed Feb. 16, 2015 to the Non-Final Office Action dated Oct. 9, 2014 from U.S. Appl. No. 14/469,469, 12 pages.
Final Office Action dated Apr. 7, 2015 from U.S. Appl. No. 14/469,469, 34 pages.
Response filed Jul. 6, 2015 to the Final Office Action dated Apr. 7, 2015 from U.S. Appl. No. 14/469,469, 17 pages.
Notice of Allowance dated Feb. 13, 2017 from U.S. Appl. No. 14/469,469, 29 pages.
Response filed Aug. 21, 2012 to First Office Action dated Aug. 3, 2012 from Chinese Patent Application No. 200880118685.2, 17 pages.
Second Office Action dated Dec. 17, 2012 from Chinese Patent Application No. 200880118685.2, 6 pages.
Response filed Jan. 7, 2013 to Second Office Action dated Dec. 17, 2012 from Chinese Patent Application No. 200880118685.2, 11 pages.
Third Office Action dated May 14, 2013 from Chinese Patent Application No. 200880118685.2, 7 pages.
Response filed May 30, 2013 to Third Office Action dated May 14, 2013 from Chinese Patent Application No. 200880118685.2, 12 pages.
Fourth Office Action dated Jul. 18, 2013 from Chinese Patent Application No. 200880118685.2, 7 pages.
Response filed Aug. 5, 2013 to Fourth Office Action dated Jul. 18, 2013 from Chinese Patent Application No. 200880118685.2, 13 pages.
Notice of Allowance with Allowed Claims dated Jan. 8, 2014 from Chinese Patent Application No. 200880118685.2, 7 pages.
Decision to Grant and Allowed Claims dated Aug. 6, 2013 from Japanese Patent Application No. 2010-536034, 6 pages.
Extended European Search Report dated Aug. 2, 2011 from European Patent Application No. 08857008.0, 7 pages.
First Office Action dated Feb. 15, 2013 from Japanese Patent Application No. 2010-536034, 4 pages.
Treu, et al., "Anonymization in Proactive Location Based Community Services", Adjunct Proceedings of Pervasive, May 2005, Munich, Germany, pp. 49-53, 5 pages.

(56) References Cited

OTHER PUBLICATIONS

International Search Report and Written Opinion dated Jul. 6, 2009 from PCT Patent Application No. PCT/US2008/081242, 11 pages.
Eagle, et al., "Social Serendipity: Proximity Sensing and Cueing", May 2004, pp. 1-18, 18 pages.
Kupper et al., "Efficient Proximity and Separation Detection among Mobile Targets for Supporting Location-based community Services", vol. 10, Issue 3, ACM, Jul. 2006, New York, USA, pp. 1-12, 12 pages.
Treu, et al., "Efficient Proximity Detection among Mobile Targets with Dead Reckoning", Proceedings of the 4th ACM international workshop on Mobility management and wireless access, 2006, ACM, New York, USA, 9 pages.
Office Action dated Dec. 10, 2010 from U.S. Appl. No. 11/947,789, 15 pages.
Response filed Mar. 9, 2011 to Office Action dated Dec. 10, 2010 from U.S. Appl. No. 11/947,789, 8 pages.
Final Office Action dated May 25, 2011 from U.S. Appl. No. 11/947,789, 12 pages.
Response filed Aug. 23, 2011 to Final Office Action dated May 25, 2011 from U.S. Appl. No. 11/947,789, 14 pages.
Notice of Allowance dated Feb. 3, 2014 from U.S. Appl. No. 11/947,789, 16 pages.
RCE filed Apr. 22, 2014 after Notice of Allowance dated Feb. 3, 2014 from U.S. Appl. No. 11/947,789, 11 pages
Notice of Allowance dated May 7, 2014 from U.S. Appl. No. 11/947,789, 9 pages.
Notice of Allowance dated Jun. 5, 2014 from U.S. Appl. No. 11/947,789, 5 pages.

\* cited by examiner

MOBILE DEVICE COMMUNICATION

BACKGROUND

Mobile telephones are no longer simply communication devices. For example, mobile telephones can maintain and provide access to media files (e.g., photographs, music, or video). Moreover, some mobile telephones have GPS (global positioning system) technology or similar technology that is related to providing location information.

Mobile telephones are thus becoming more like hybrids of communication, computing and other electronic devices. However, while beneficial to the owner of the mobile telephone, there have been no particular considerations given to relationships between different mobile telephones with respect to such capabilities.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a mobile computing device/telephone operates differently based on detected proximity to another mobile device with which the first mobile device has a defined relationship. For example, the first mobile device may configure itself to transfer content to the second mobile computing device when proximity corresponds to a non-cellular communications coupling, such as Bluetooth® or Wi-Fi. Alternatively, or in addition to, the mobile device (or both devices) may output a notification to indicate that the other mobile computing device has been detected within a threshold proximity, such as via GPS data or by being within the same cellular tower.

In one aspect, a first mobile telephone includes a proximity detector that detects proximity with a second mobile telephone with which the first mobile telephone has a defined relationship. Proximity logic coupled to the proximity detector changes an operation of the first mobile telephone when proximity with the second mobile telephone is detected. The proximity detector may comprise a monitor that monitors the status of a non-cellular communications coupling between the first mobile telephone and the second mobile telephone. The proximity detector may also comprise a communication module that monitors location data (e.g., GPS or cellular tower data) sent to the first mobile telephone.

The proximity logic may include comprise a process manager that locates content to send from the first mobile telephone to the second mobile telephone, and a transmission module coupled to the process manager that sends the content. The proximity logic may include an action controller that computes from location data received at the proximity detector whether the second mobile telephone is within a threshold distance-related proximity of the first mobile telephone, and a status manager coupled to the action controller that determines whether to output a proximity notification. The determination as to whether to output a notification may include determining whether a notification function is active, and/or determining whether a time for outputting the notification is reached.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards operations performed on a mobile telephone (including other wireless communication devices) when in a defined proximity relationship with one another mobile telephone. In general, examples of such operations based on proximity relationships as described herein are directed towards content (e.g., media) sharing and outputting notifications.

As will be understood, proximity may be defined in different ways with respect to different functionality. For example, proximity may be distance based, but need not be an actual distance, e.g., proximity may mean within Bluetooth® range or other wired or wireless range, being coupled to the same LAN, being within a certain GPS-defined distance, being within range of the same cell tower or certain set of towers, and so forth. Further, while the examples herein are primarily described with respect to a relationship between two mobile telephones, it is understood that any practical number of mobile telephones or like communication-capable devices may share information and/or output information in the manner described herein. Still further, the exemplified operations may be based on proximity relationships between mobile telephones, but other wireless and even landline-coupled devices (e.g., computers and landline telephones) may also benefit from the various aspects described herein with respect to proximity relationships.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in mobile devices and communication in general.

Figure 1:
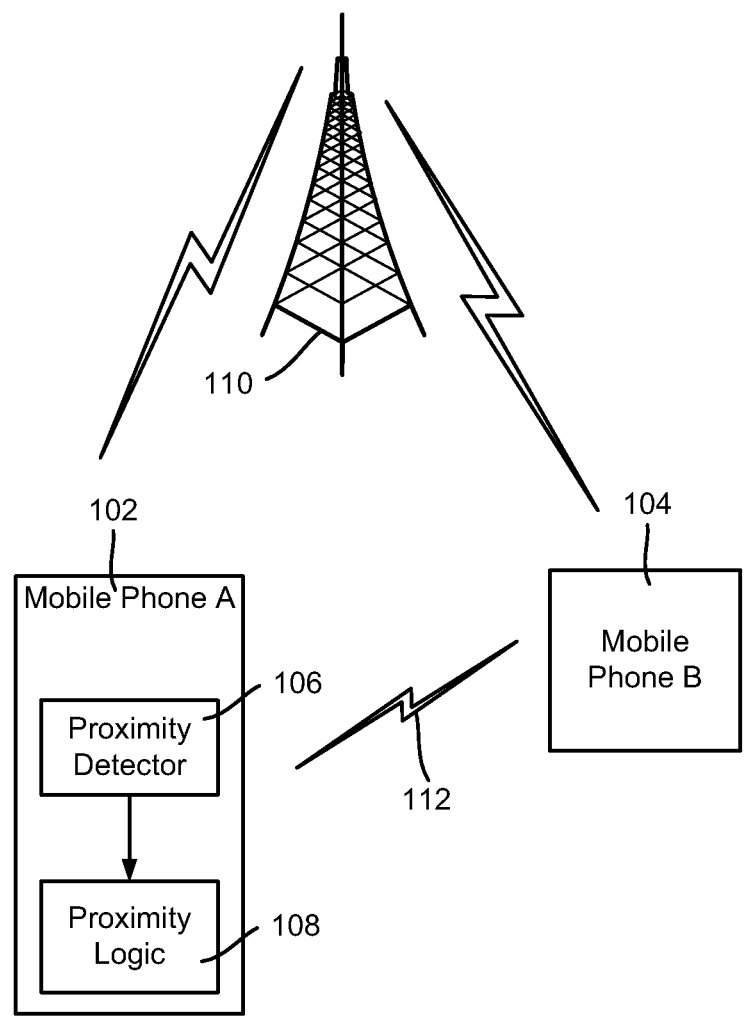
FIG. 1 is a block diagram representing an example communications environment in which mobile telephones communicate with one another.

Turning to FIG. 1, there is shown a pair of mobile telephones, exemplified as mobile telephone A 102 and mobile telephone B 104, which operate in a relationship with one another. The relationship may be user defined, or may be defined in advance, e.g., as a pair of telephones purchased together and programmed by the manufacturer or service provider to have such a relationship.

As described below, when a proximity detector 106 of the mobile telephone A 102 detects that the mobile telephone B 104 is within a certain proximity, the proximity detector 106 triggers proximity logic 108 to possibly modify the operation of the mobile telephone A 102. The proximity logic 108 is typically an operating system component, but may be a separate component such as a standalone application program, for example. Note that the proximity detector 106 need not directly trigger the proximity logic 108, but can instead regularly (or otherwise) report location or other information to the proximity logic 108, which can then trigger its logic operations as appropriate. Further note that mobile telephone B 104 typically includes a similar proximity detector and proximity logic.

As represented in FIG. 1, the mobile telephones 102 and 104 are capable of communicating via one or more cellular towers 110. As also represented by the communications link labeled 112, the mobile telephones 102 and 104 may be capable of communicating via a short range non-cellular communications coupling, such as via a Bluetooth® or Wi-Fi link.

Figure 2:
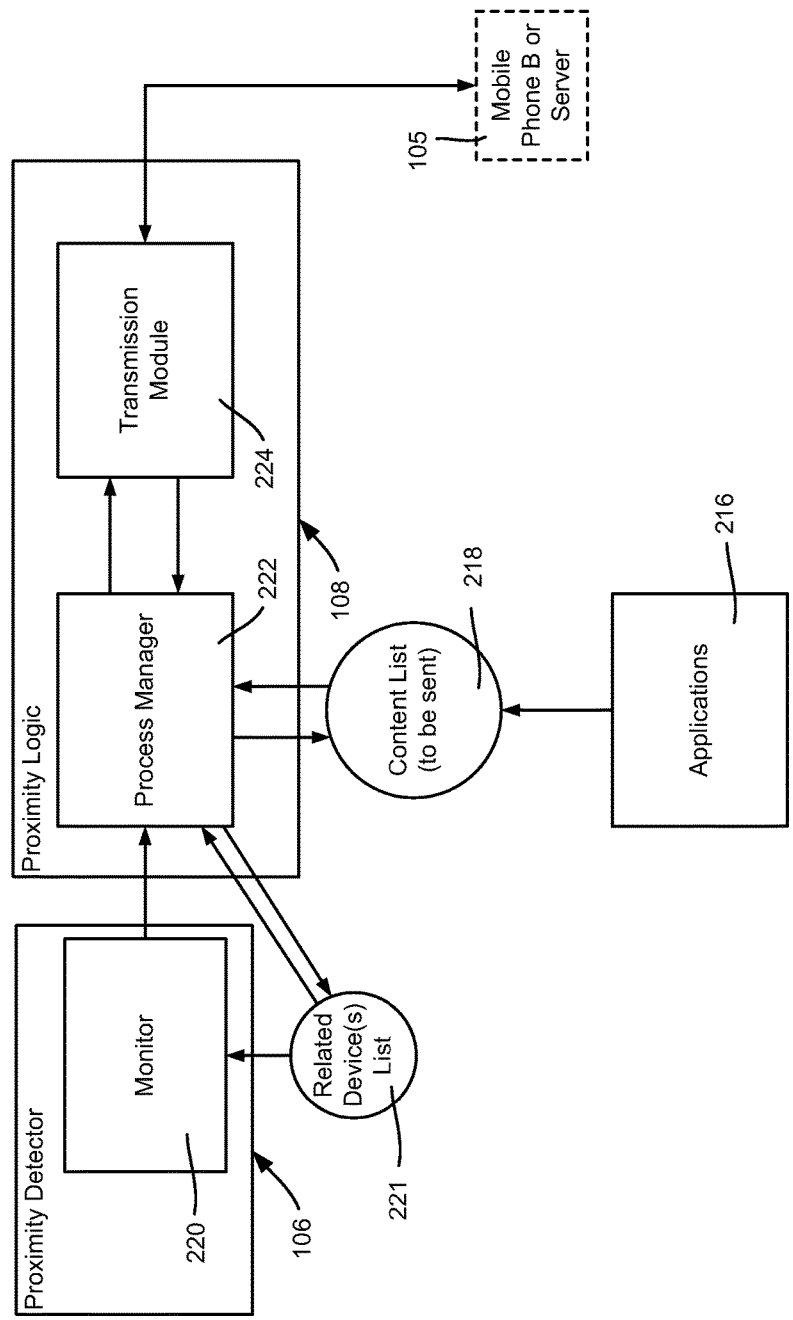
FIG. 2 is a representation of example components within a mobile telephone by which content may be selectively transferred to another mobile telephone based on a defined relationship between mobile telephones and proximity comprising a short range non-cellular communications coupling.

FIG. 2 shows an aspect of proximity detection with respect to one type of operation, which is related to content sharing. In general, an application program (of applications 216) or the like adds content such as media to a content list 218. The application is typically an independent component, and refers to any application or other code that needs to send content such as media data to another mobile device. In one implementation, the content list 218 comprises a buffer (e.g., a folder) in which the content files to be transferred are kept, along with a file name list. Alternatively, content to be sent may be maintained in its current location on the device, and accessed as needed via a reference corresponding to that current location.

By way of example, a user viewing a photograph such as a .jpg file may specify from a viewing application program that the .jpg file (or an identifier of the file) be added to the content list 218. The user may specify that the content be transmitted to a particular device (e.g., to the mobile telephone B or to a server to which the mobile telephone B will connect, as represented by block 105), or the transmission may be automatically set up for a destination, such as the mobile telephone B by default if no other recipients are specified or known. For example, there may a "send-to-telephone B" folder. The content may be buffered or may be accessed by a reference to its current location.

Unlike conventional data transfer, however, unless specifically directed by the user to send the content (e.g., via GPRS), the proximity detector 106 and proximity logic 108 defer sending the content until a proximity-based, short range non-cellular connection (communications coupling) is established between the source (mobile telephone A 102) and the destination (block 105). In this way, there is no cost related to sending the content, e.g., there are no minutes or other GPRS charges that are incurred when sending and/or receiving the content.

To this end as generally represented in FIG. 2, the proximity detector 106 includes a monitor 220 that monitors the status of a short-range non-cellular connection between the mobile telephone A 102 and the mobile telephone B 104 (or a server as represented by the block 105). For example, the connection may be a Bluetooth® connection, or a LAN connection, such as a wireless LAN shared by both devices. Other connections, such as an infrared or FM link, are also detectable and may be used for content sharing. GPS-based proximity may also be used.

If a server is used as an intermediate transfer mechanism, an indirect connection may be established as the coupling, e.g., the mobile telephone A 102 may transfer the content to the server, which then transfers the content to the mobile telephone B 104 when the mobile telephone B establishes or has a connection with the server. Note that by "short range," it is only meant that each device can couple to a communications medium by non-cellular connections; for example an internet connection may be available to each mobile telephone via a short range connection, whereby a communications coupling may be made even though the two mobile telephones may be very physically distant from one another, and possibly outside of any cellular service area.

In any event, when a non-cellular communications coupling between related devices is determined or the ability to establish a non-cellular coupling is determined and one is set up, the monitor 220 sends a signal to a process manager component 222 of the proximity logic 108. Note that defined relationships between devices may be determined from a list 221 of one or more related devices.

In general, the process manager 222 controls the process of push sharing media content to the other device, the mobile telephone B or server (block 105). To this end, the process manager 222 communicates with a transmission module 224 and accesses the content list 218, e.g., a media list database 226. If content is ready for transmission to the specified recipient device, the content is transferred via the transmission module 224.

In this example, the process manager 222 controls the status of the transmission and decides when to start/stop the data transferring. With respect to transmission, the transmission module 224 gets the data (or an identifier corresponding the file location or the like) from the process manager 222 and starts transferring the data. The transmission module 224 notifies the process manager 222 of the transferring status and result.

When the media transferring finishes successfully, the process manager 222 clears the content list 218 with respect to this particular recipient. Note that partially-successful transmissions or the like may be partially cleared, e.g., so that only deltas may later be transmitted to complete a content transmission. Further, note that a recipient may be a "group" of telephones, whereby rather than deleting the file from content list, the file is only deleted from the telephone (or telephones) in the group to which it was sent, until no recipients remain or the list is cleared by some other means (e.g., by manual deletion or expiration). Still further, there may be a time when a non-cellular connection is not necessary to save cellular transmission expense. For example, a user may have free (or very inexpensive) minutes during evenings or weekends, at the end of the billing cycle, and so forth. The content list may be cleared by transferring over GPRS or the like at such a time.

As can be seen, two mobile telephones thus may thus share content files (such as media files comprising photographs, music, or video). By searching for and detecting another device when it is proximate (e.g., using Wi-Fi or Bluetooth® technology), a communications coupling may be set up and data transferred, using a peer-to-peer relationship rather than a cellular (e.g., GPRS) connection. The user can share content any time the user desires, although transmission of the content file is only pending, and real transmission deferred until the two phones are in sufficiently nearby proximity to establish a non-cellular, peer-to-peer connection or other coupling.

Figure 3:
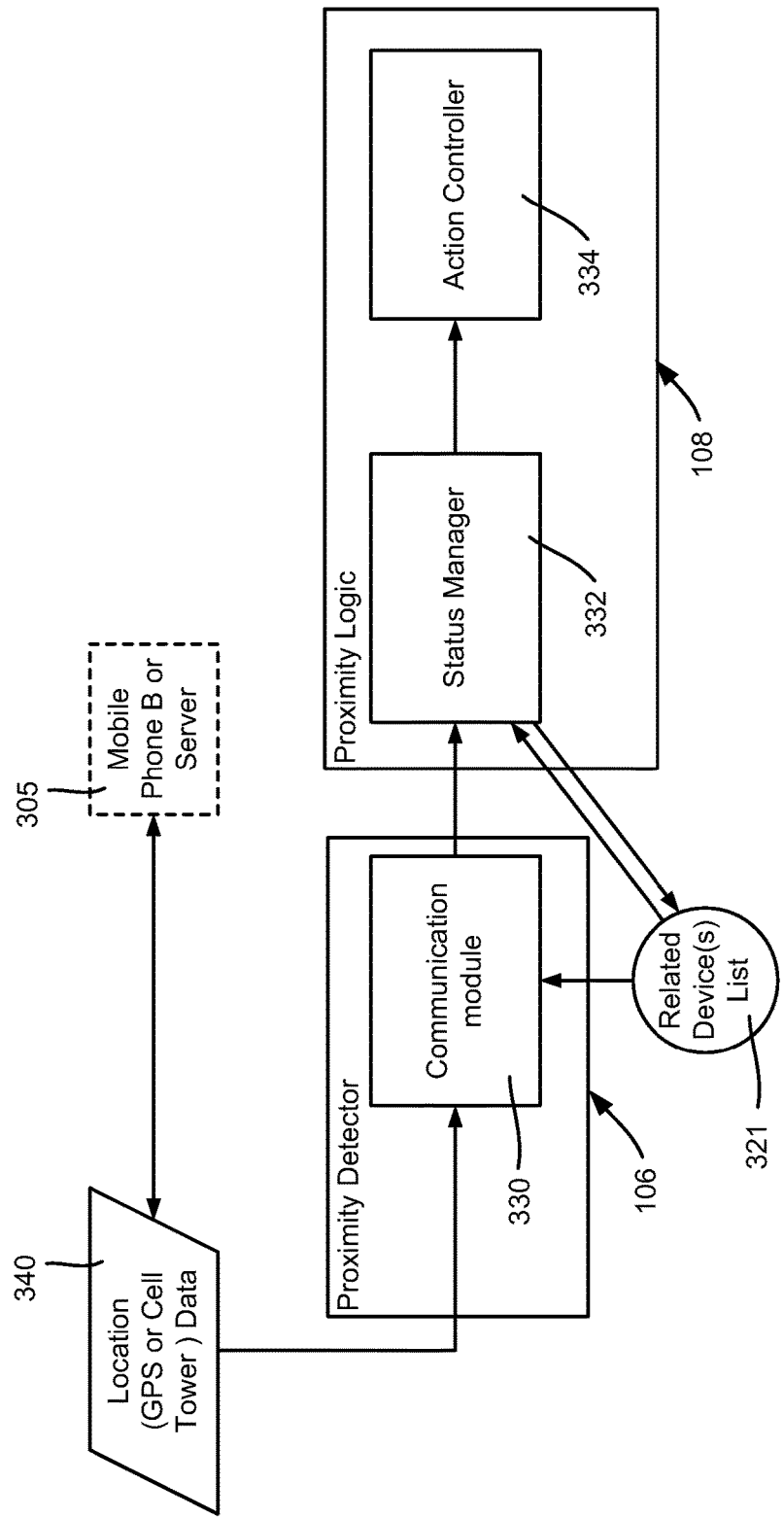
FIG. 3 is a representation of example components within a mobile telephone by which a notification may be output based upon proximity to another mobile telephone with which a relationship has been defined.

Turning to another proximity-related operation, namely proximity-based notification, FIG. 3 shows how the proximity detector 106 and proximity logic 108 can provide a notification when two related mobile devices are within a certain threshold distance of one another. For example, when two (or more) people are meeting, generally one person arrives earlier than the other, and this person would like to know where the other person is and how long it will likely take for the other person to get there. One current solution for is to send a text message or make a phone call. However, this is not always a convenient solution, e.g., when driving; further, proximity notification may be valuable in many other situations.

Instead of manually making a telephone call or sending a text message, through GPS or other location-based technology, a mobile telephone may provide location information to another mobile telephone. Note that consent is a factor, as people with privacy concerns do not necessarily want others to know their exact locations at all times.

With respect to notification, if one mobile telephone user consents to "push" notify another mobile telephone of a current location, a recipient mobile telephone may provide audible, visible or tactile feedback to its user, e.g., as settings are controlled by the recipient. The notifying mobile telephone may control how exact the notification is with respect to a current location and also may notify its user of the notification being sent, e.g., two related telephones may buzz or make other sounds when the two related devices are close to each other (such as within 500-2000 meters), whereby the mobile telephone people knows that the other person is nearby, without either party manually doing anything.

With respect to privacy, people may avoid using phone calls or text messages ask another's location information, as this is intrusive. Instead, a user can configure a mobile telephone to push such information to another. The sender (as well as the receiver) can configure the device such that actual location information is not disclosed, that is, there is only a closeness notification; other movement information is not known.

In another aspect, the type of notification may vary, such as with distance. For example, a slow beep, flash and/or buzz may occur when a user is within 2000 meters, a medium fast beep, flash and/or buzz when within 1000 meters, and a fast beep, flash and/or buzz when within 500 meters. Anything that can be output and perceived may be changed, e.g., frequency, color, vibration intensity, length of notification and so forth may change based on measured or otherwise sensed proximity.

For mobile telephones that do not provide GPS support, cell tower identification (ID) information may be used. Each mobile telephone knows the ID of the cell tower to which it is closest, and this cell tower ID may be automatically exchanged with another telephone to determine whether they match, in which event both are within a certain proximity. With the cooperation of a service provider, the exchange can be part of the control channel information sent between the cell tower and appropriately registered mobile telephones within its range. Further, a set of cellular tower IDs may be used instead of only the same cell tower ID, e.g., a user in an adjacent cell tower can notify the related user of the adjacent cell location.

Thus, a person's mobile telephone can automatically let another know of nearby proximity by pushing location information to the other phone. Built-in GPS support may be used for very accurate notification, or cellular tower matching for lesser, but still somewhat reasonable accuracy.

FIG. 3 provides one general example of a model implementation, in which a communication module 330 of the proximity detector 106 receives location information 340 of another mobile telephone with which it has a defined relationship. In this example, the communication module 330 also may send out its own location information, e.g., GPS or cell tower information. A list 321 of one or more defined related devices (which may or may not be the same set of devices listed for media transfer in FIG. 2) may be used to control to which devices to send data, as well as to filter out and discard location information received (e.g., erroneously) from non-related devices.

To send and/or receive data from a related telephone, a text message or other communication (such as via the cellular tower control channel) may be sent. Alternatively, a sharing location may be maintained in a server (block 305) to which both mobile telephones are configured to send and/or receive data.

As represented in FIG. 3, a status manager 332 generally manages the status of the notification function, such as to determine operations based on whether or the notification function is active (turned on) or not (turned off). Another status operation may include determining how frequently to notify the users, e.g., if the two phones are close enough and both users have been recently reminded, another reminder is deferred so as to not make the notification process annoying; notification frequency may be user configurable. The status manager 332 may also determine which type of reminder is to be sent to the user (e.g., a buzz, ring, or popped-up image), which as described above may be user configurable and also related to the actual detected closeness. Note that even without user configuration, a current operating mode of a mobile device may factor into the type of reminder, e.g., a mobile telephone set to operate in a normal ring mode may play an audible sound for a notification, whereas a mobile telephone set to operate in a vibrate mode may quietly buzz and vibrate for a notification.

Also represented in FIG. 3 is an action controller 334, which in general uses the data received from the other phone's communication module to decide whether to take action or not (or what type of action) based on some calculation. For example, if GPS data is received as the location data 340 from the other mobile telephone and the current mobile telephone's GPS data is known, a distance calculation may be made by the action controller 334. If the computed distance is below a certain threshold, a notification may be output; (as described above, the type and/or settings of the notification may be varied based on different threshold measurements).

For cell tower ID-based location data 340, if the two phones are using the same cell tower, then the action controller 332 may provide a notification. As also described above, the type and/or settings of a notification may be varied based on whether a distance or other proximity (e.g., adjacent) relationship is known between different cellular tower IDs.

Figure 4:
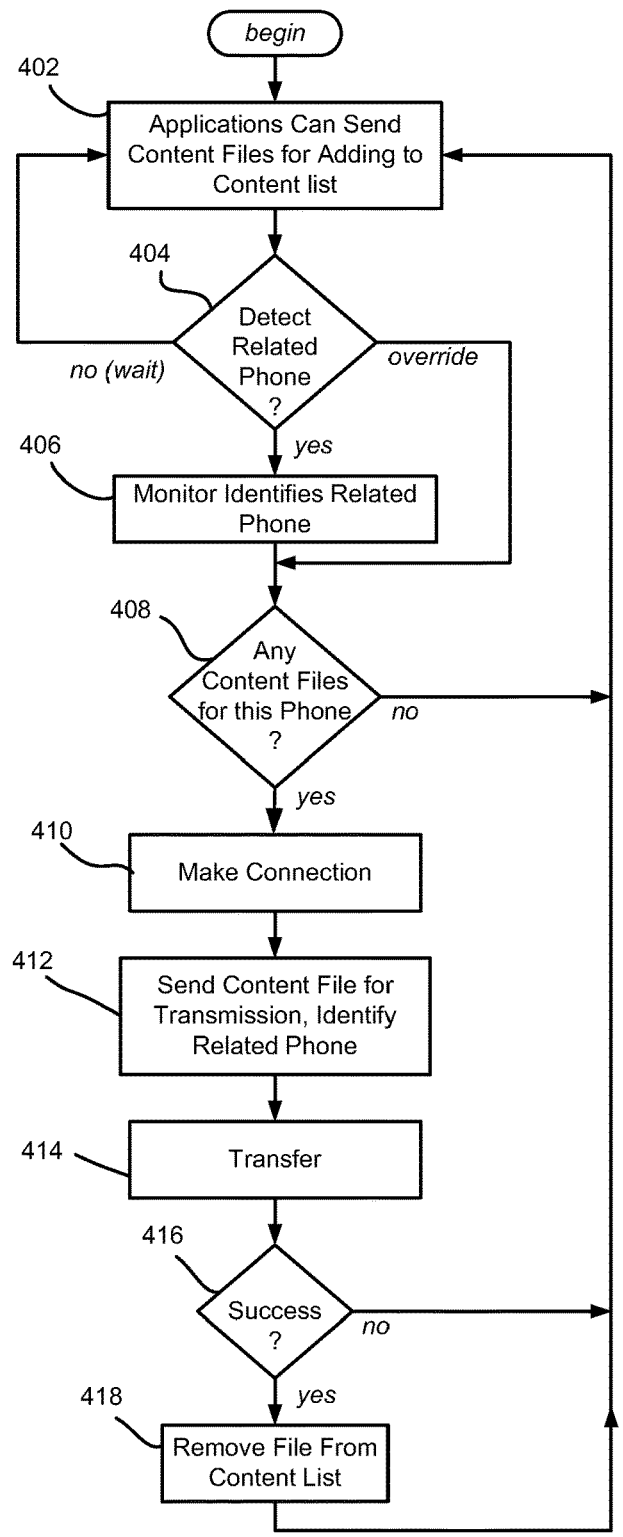
FIG. 4 is a flow diagram representing example steps taken to transfer content from one mobile telephone to another mobile telephone based on a defined relationship between the mobile telephones and proximity comprising a short range non-cellular communications coupling.
Figure 5:
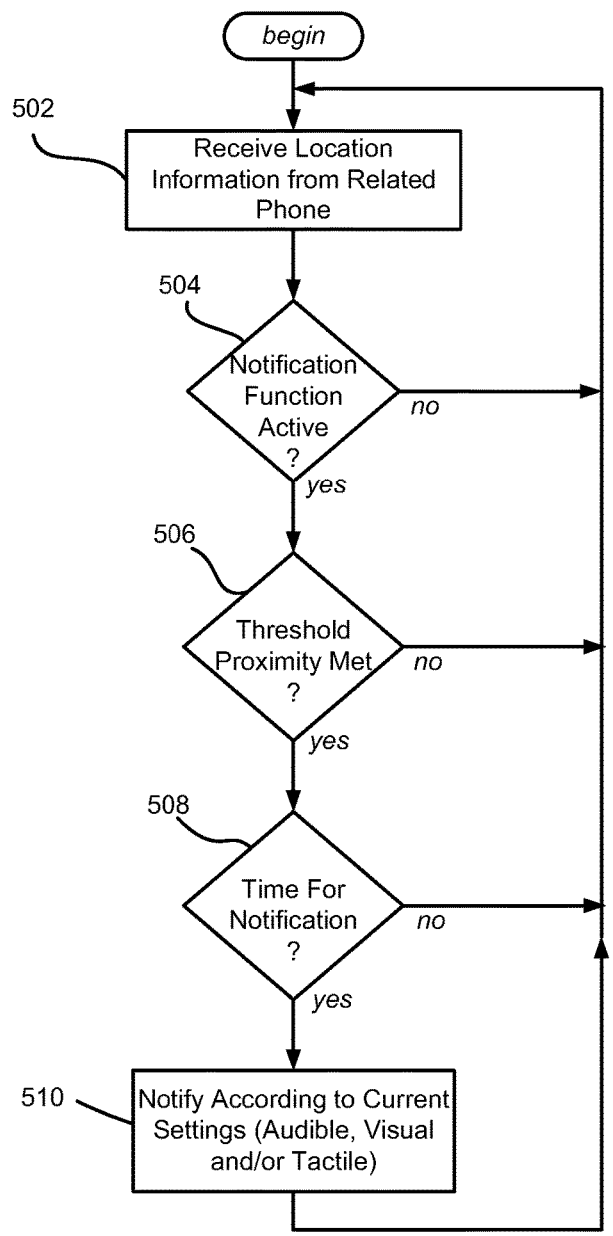
FIG. 5 is a flow diagram representing example steps taken to output a notification on a mobile telephone based on a defined relationship between the mobile telephone and another mobile telephone, and a proximity detected between the telephones.

Turning to an explanation of example proximity-based operation changes, FIG. 4 provides an example workflow for proximity-sensed media transfer, and FIG. 5 provides an example workflow for proximity-sensed notification.

In FIG. 4, beginning at step 402 when two phones with a defined relationship are not yet connected (such as because they are not in close proximity), one or more applications each may send (or identify) a content file, which is added to the content list for later transfer. Step 402 represents waiting for the related telephone (or server to which the related telephone will likely couple) to be detected via the monitor as being in proximity, e.g., within Bluetooth® range or able to connect to one another via a wireless LAN or other non-cellular means, for example. Step 404 also represents an override option, in which a user specifies that the content file is to be sent to a particular mobile telephone (e.g., via GPRS or other cellular connection) regardless of any proximity-based non-cellular connection status. Manual override and/or automatic override (e.g., based on time of day) may be used.

Step 406 represents the monitor recognizing the related telephone as being in its related telephone list, such as via a unique identifier, (which may be the other telephone's phone number). For example, using the example modules of FIG. 2, at step 406 the monitor 220 tells the process manager 222 that the other mobile telephone is nearby, and tells the process manager 222 the name (identity) of the other phone. From the user's perspective, the name may be a user-friendly name, converted to a unique identity or the like by the logic.

Step 408 evaluates (e.g., in the process manager 222) whether there are any content files pending for transfer to the related telephone. Step 410 represents making the coupling, although as can be readily appreciated, a connection process may be started as soon as the related telephone was detected at step 404, and indeed, a connection may have been automatic and used in making the detection.

If there is at least one content file to be sent, at step 410 the process manager 222 sends the content file (or an identifier thereof by which the file may be accessed) to the transmission module 224, and tells the transmission module 224 the identity of the recipient mobile telephone (or server).

Step 414 represents the transmission module transferring the data. If the data was sent successfully, at step 416 the transmission module 224 notifies the process manager 222 that the data was sent out and at step 418 the process manager 222 removes the data file from the content list. As described above, an unsuccessful transmission (e.g., the connection was broken) can result in the entire data file being re-sent, or some part thereof being re-sent, provided the transmission file is capable of informing the process manager as to what part (or parts) was successfully sent, and the recipient can accept partial data and build up the content file.

With respect to an example proximity-based workflow for notifications, FIG. 5 shows example steps beginning at step 502 where location information is received at one mobile telephone from a telephone having a defined relationship therewith for notifications. Step 504 represents evaluating whether the notification function is active, which if not, basically ignores the received location information.

If the notification function is active, step 506 is executed to perform the threshold proximity evaluation. As described above, this determination may be made with GPS data, may be by cellular tower ID, or some other location-related data. As also described above, there may be different thresholds that result in different types of notifications, however in any event, at least a minimum threshold may be required before some notification is made. If not met, the process basically discards the location data, at least with respect to issuing a notification.

Step 508 represents evaluating the notification frequency, e.g., whether a notification is to be issued or not depending on how recently a previous notification was issued. The time may vary dependent on a type of notification, e.g., a very close proximity may have a shorter time than a relatively distant proximity. Further, the time may be varied based on which threshold was met, e.g., if a sender has crossed a threshold so as to now be closer than a previously computed threshold, a new notification may be sent regardless of the last time a notification was sent. Although the simplified workflow of FIG. 5 represents returning to step 502 if the notification time requirement is not met, it can be readily appreciated that step 508 may also delay until the time requirement is met, e.g., if location information is only sent once per minute and the time for the next notification is less than one minute, the notification can be delayed until due (or even immediately output) based on the knowledge that another set of location data will not be received until after the notification is due.

If a notification is to be output, step 510 represents outputting the notification according to the current device settings. The notification may be any of an audible, tactile or visual output, which may be user configurable, threshold dependent, and so forth. An acknowledgement or counterpart notification may be provided to the sender.

Exemplary Operating Environment

Figure 6:
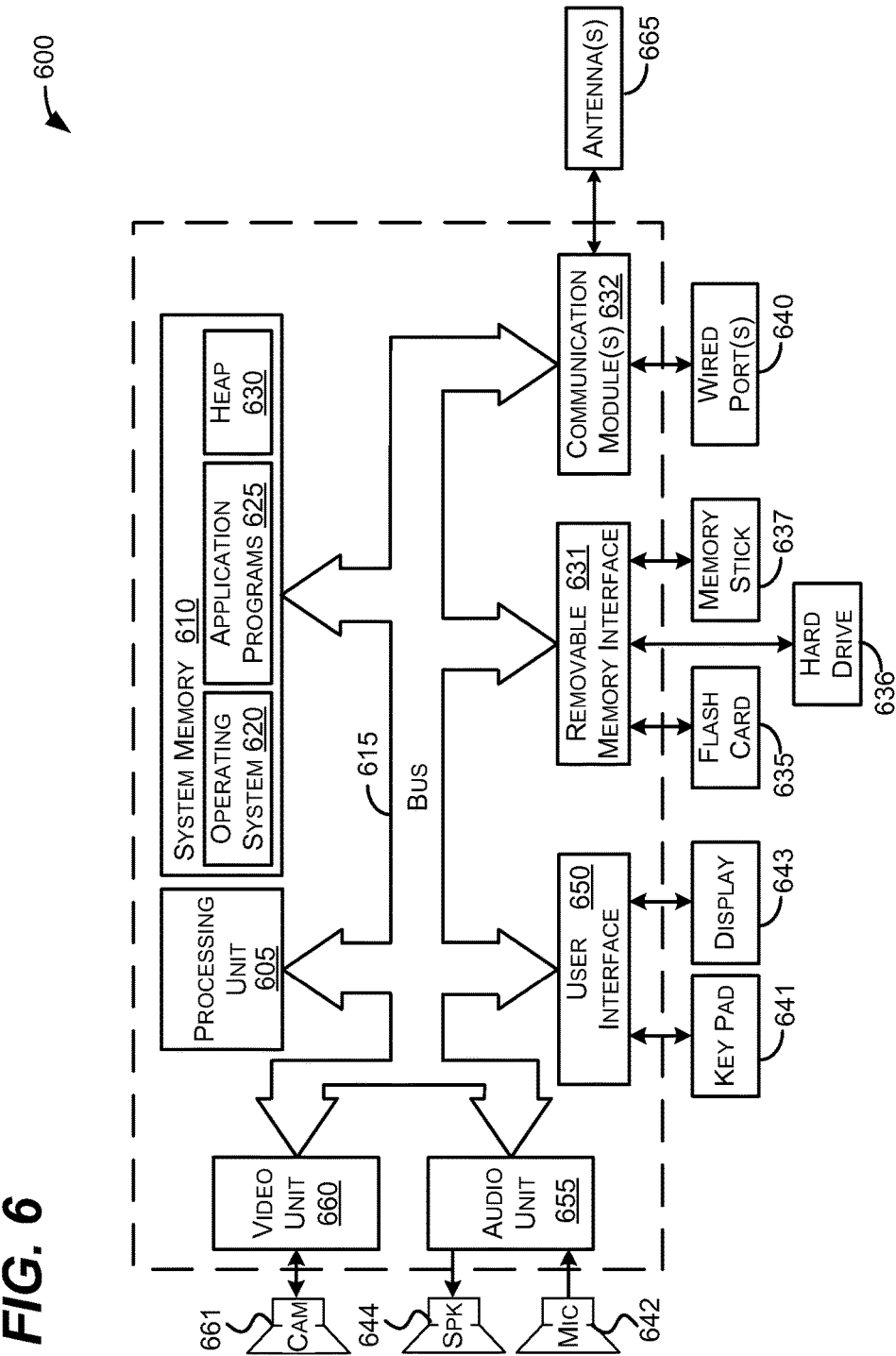
FIG. 6 shows an illustrative example of a computing and communication device into which various aspects of the present invention may be incorporated.

FIG. 6 illustrates an example of a suitable mobile device 600 on which aspects of the subject matter described herein may be implemented. The mobile device 600 is only one example of a device and is not intended to suggest any limitation as to the scope of use or functionality of aspects of the subject matter described herein. Neither should the mobile device 600 be interpreted as having any dependency or requirement relating to any one or combination of components illustrated in the exemplary mobile device 600.

With reference to FIG. 6, an exemplary device for implementing aspects of the subject matter described herein includes a mobile device 600. In some embodiments, the mobile device 600 comprises a cell phone, a handheld device that allows voice communications with others, some other voice communications device, or the like. In these embodiments, the mobile device 600 may be equipped with a camera for taking pictures, although this may not be required in other embodiments. In other embodiments, the mobile device 600 comprises a personal digital assistant (PDA), hand-held gaming device, notebook computer, printer, appliance including a set-top, media center, or other appliance, other mobile devices, or the like. In yet other embodiments, the mobile device 600 may comprise devices that are generally considered non-mobile such as personal computers, servers, or the like.

Components of the mobile device 600 may include, but are not limited to, a processing unit 605, system memory 610, and a bus 615 that couples various system components including the system memory 610 to the processing unit 605. The bus 615 may include any of several types of bus structures including a memory bus, memory controller, a peripheral bus, and a local bus using any of a variety of bus architectures, and the like. The bus 615 allows data to be transmitted between various components of the mobile device 600.

The mobile device 600 may include a variety of computer-readable media. Computer-readable media can be any available media that can be accessed by the mobile device 600 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 600.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, Wi-Fi, WiMAX, and other wireless media. Combinations of any of the above should also be included within the scope of computer-readable media.

The system memory 610 includes computer storage media in the form of volatile and/or nonvolatile memory and may include read only memory (ROM) and random access memory (RAM). On a mobile device such as a cell phone, operating system code 620 is sometimes included in ROM although, in other embodiments, this is not required. Similarly, application programs 625 are often placed in RAM although again, in other embodiments, application programs may be placed in ROM or in other computer-readable memory. The heap 630 provides memory for state associated with the operating system 620 and the application programs 625. For example, the operating system 620 and application programs 625 may store variables and data structures in the heap 630 during their operations.

The mobile device 600 may also include other removable/non-removable, volatile/nonvolatile memory. By way of example, FIG. 6 illustrates a flash card 635, a hard disk drive 636, and a memory stick 637. The hard disk drive 636 may be miniaturized to fit in a memory slot, for example. The mobile device 600 may interface with these types of non-volatile removable memory via a removable memory interface 631, or may be connected via a universal serial bus (USB), IEEE 6394, one or more of the wired port(s) 640, or antenna(s) 665. One of the antennas 665 may receive GPS data. In these embodiments, the removable memory devices 635-137 may interface with the mobile device via the communications module(s) 632. In some embodiments, not all of these types of memory may be included on a single mobile device. In other embodiments, one or more of these and other types of removable memory may be included on a single mobile device.

In some embodiments, the hard disk drive 636 may be connected in such a way as to be more permanently attached to the mobile device 600. For example, the hard disk drive 636 may be connected to an interface such as parallel advanced technology attachment (PATA), serial advanced technology attachment (SATA) or otherwise, which may be connected to the bus 615. In such embodiments, removing the hard drive may involve removing a cover of the mobile device 600 and removing screws or other fasteners that connect the hard drive 636 to support structures within the mobile device 600.

The removable memory devices 635-637 and their associated computer storage media, discussed above and illustrated in FIG. 6, provide storage of computer-readable instructions, program modules, data structures, and other data for the mobile device 600. For example, the removable memory device or devices 635-637 may store images taken by the mobile device 600, voice recordings, contact information, programs, data for the programs and so forth.

A user may enter commands and information into the mobile device 600 through input devices such as a key pad 641 and the microphone 642. In some embodiments, the display 643 may be touch-sensitive screen and may allow a user to enter commands and information thereon. The key pad 641 and display 643 may be connected to the processing unit 605 through a user input interface 650 that is coupled to the bus 615, but may also be connected by other interface and bus structures, such as the communications module(s) 632 and wired port(s) 640.

A user may communicate with other users via speaking into the microphone 642 and via text messages that are entered on the key pad 641 or a touch sensitive display 643, for example. The audio unit 655 may provide electrical signals to drive the speaker 644 as well as receive and digitize audio signals received from the microphone 642.

The mobile device 600 may include a video unit 660 that provides signals to drive a camera 661. The video unit 660 may also receive images obtained by the camera 661 and provide these images to the processing unit 605 and/or memory included on the mobile device 600. The images obtained by the camera 661 may comprise video, one or more images that do not form a video, or some combination thereof.

The communication module(s) 632 may provide signals to and receive signals from one or more antenna(s) 665. One of the antenna(s) 665 may transmit and receive messages for a cell phone network. Another antenna may transmit and receive Bluetooth® messages. Yet another antenna (or a shared antenna) may transmit and receive network messages via a wireless Ethernet network standard.

In some embodiments, a single antenna may be used to transmit and/or receive messages for more than one type of network. For example, a single antenna may transmit and receive voice and packet messages.

When operated in a networked environment, the mobile device 600 may connect to one or more remote devices. The remote devices may include a personal computer, a server, a router, a network PC, a cell phone, a peer device or other common network node, and typically includes many or all of the elements described above relative to the mobile device 600.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more standalone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   receiving an indication from a user of a first mobile computing device identifying a second mobile computing device to communicate with;
   detecting whether a Wi-Fi internet connection is available to the first mobile computing device;
   in a first instance, responsive to a determination that the Wi-Fi internet connection is available to the first mobile computing device, using the Wi-Fi internet connection instead of cellular communication to send a first message from the first mobile computing device to the second mobile computing device; and
   in a second instance, responsive to a determination that the Wi-Fi internet connection is not available to the first mobile computing device, using the cellular communication instead of the Wi-Fi internet connection to send a second message from the first mobile computing device to the second mobile computing device.

2. The method of claim 1, further comprising:
   in the first instance, sending the first message over the Wi-Fi internet connection to a server that sends the first message to the second mobile computing device; and
   in the second instance, sending the second message to the server using the cellular communication, wherein the server sends the second message to the second mobile computing device.

3. The method of claim 1, further comprising:
   providing an option whether to use the cellular communication when the Wi-Fi internet connection is not available;
   receiving a user input accepting the option to use the cellular communication when the Wi-Fi internet connection is not available; and
   using the cellular communication to send the second message in the second instance based at least on the user input accepting the option.

4. The method of claim 1, further comprising:
   monitoring availability of the Wi-Fi internet connection based at least on a location of the first mobile computing device.

5. The method of claim 4, further comprising obtaining the location of the first mobile computing device via Global Positioning System functionality of the first mobile computing device.

6. The method of claim 1, the first message comprising a media file.

7. A mobile computing device comprising:
   a hardware processing unit; and
   a hardware computer storage medium storing computer-readable instructions which, when executed by the hardware processing unit, cause the hardware processing unit to:
   receive indications from a user of the mobile computing device requesting to communicate with other mobile computing devices;
   detect whether Wi-Fi internet communication is available between the mobile computing device and the other mobile computing devices;
   for a first other mobile computing device for which the Wi-Fi internet communication with the mobile computing device is available, send a first message from the mobile computing device to the first other mobile computing device using the Wi-Fi internet communication instead of cellular communication; and
   for a second other mobile computing device for which the Wi-Fi internet communication with the mobile computing device is not available, send a second message from the mobile computing device to the second other mobile computing device using the cellular communication instead of the Wi-Fi internet communication.

8. The mobile computing device of claim 7, wherein the computer-readable instructions, when executed by the hardware processing unit, cause the hardware processing unit to:
   display a notification that the first other mobile computing device is available via the Wi-Fi internet communication.

9. The mobile computing device of claim 8, the notification comprising changing a color displayed on the mobile computing device.

10. The mobile computing device of claim 7, wherein the computer-readable instructions, when executed by the hardware processing unit, cause the hardware processing unit to:
    determine a specified time of day when the cellular communication is used for message communication; and
    defer sending the second message to the second other mobile computing device until the specified time of day.

11. The mobile computing device of claim 7, embodied as a cell phone.

12. The mobile computing device of claim 7, wherein the computer-readable instructions, when executed by the hardware processing unit, cause the hardware processing unit to:

send the first message to a server configured to send the first message to the first other mobile computing device.

13. A system comprising the mobile computing device of claim 12 and the server.

14. The system of claim 13, further comprising the first other mobile computing device and the second other mobile computing device.

15. A mobile computing device comprising:
a hardware processing unit; and
a hardware computer storage medium storing computer-readable instructions which, when executed by the hardware processing unit, cause the hardware processing unit to:
receive an indication from a user of the mobile computing device identifying a second mobile computing device to communicate with;
detect whether a Wi-Fi internet connection is available to the mobile computing device;
in a first instance, responsive to a determination that the Wi-Fi internet connection is available to the mobile computing device, use the Wi-Fi internet connection instead of cellular communication to send a message from the mobile computing device to the second mobile computing device; and
in a second instance, responsive to a determination that the Wi-Fi internet connection is not available to the mobile computing device, use the cellular communication instead of the Wi-Fi internet connection to send the message from the mobile computing device to the second mobile computing device.

16. The mobile computing device of claim 15, wherein the computer-readable instructions, when executed by the hardware processing unit, cause the hardware processing unit to:
in the first instance, send the message to a server that sends the message to the second mobile computing device.

17. The mobile computing device of claim 16, the message comprising a media file.

\* \* \* \* \*